(12) United States Patent
Ulatoski

(10) Patent No.: US 10,372,474 B2
(45) Date of Patent: Aug. 6, 2019

(54) PREDICTIVE LOGIN OF VIRTUAL MACHINES

(71) Applicant: VMware, Inc., Palo Alto, CA (US)

(72) Inventor: Jeffrey Ulatoski, Pleasanton, CA (US)

(73) Assignee: VMware, Inc., Palo Alto, CA (US)

( * ) Notice: Subject to any disclaimer, the term of this patent is extended or adjusted under 35 U.S.C. 154(b) by 151 days.

(21) Appl. No.: 15/169,579

(22) Filed: May 31, 2016

(65) Prior Publication Data

US 2017/0344392 A1 Nov. 30, 2017

(51) Int. Cl.
*G06F 9/455* (2018.01)
*G06F 21/31* (2013.01)
*G06F 9/445* (2018.01)
*G06F 9/50* (2006.01)

(52) U.S. Cl.
CPC ........ *G06F 9/45558* (2013.01); *G06F 9/4451* (2013.01); *G06F 9/5005* (2013.01); *G06F 21/316* (2013.01); *G06F 2009/45562* (2013.01); *G06F 2009/45575* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 7,765,279 B1 * | 7/2010 | Kaib | G06F 17/30867 705/35 |
| 2010/0235831 A1 * | 9/2010 | Dittmer | G06F 9/45558 718/1 |
| 2015/0242756 A1 * | 8/2015 | Chittimalla | H04L 67/2847 706/52 |

* cited by examiner

*Primary Examiner* — Gregory A Kessler

(57) ABSTRACT

Described herein are systems, methods, and software to configure virtual machines for end users based on a login history for the end users. In one implementation, a method of operating a virtual computing service that dynamically configures virtual machines includes capturing a login history indicative of when users login to a plurality of virtual machines using the virtual computing service. The method further provides, identifying an anticipated login time for a subset of the users based on the login history and identifying a configuration for the subset of users that is earlier than the anticipated login time. The method also includes, configuring a virtual machine at the configuration time for each user in the subset of the users by attaching at least one storage volume associated with the user to the virtual machine.

20 Claims, 11 Drawing Sheets

| USER ID COLUMN 610 | TIME COLUMN 620 | TIME COLUMN 621 | TIME COLUMN 622 | TIME COLUMN 623 |
|---|---|---|---|---|
| USER 611 | TIME | TIME | TIME | TIME |
| USER 612 | TIME | TIME | TIME | TIME |
| USER 613 | TIME | TIME | TIME | TIME |
| ••• | ••• | ••• | ••• | ••• |
| USER 614 | TIME | TIME | TIME | TIME |

PREDICTIVE LOGIN OF VIRTUAL MACHINES

TECHNICAL BACKGROUND

In virtual computing environments, host computers may execute a plurality of virtual machines that can be accessed as a service by end users. These users may login to the service via end user devices and, in response to the login, be provided with a virtual machine to accomplish desired tasks. Once the user logs out of the service or the virtual machine, the service may allocate the same virtual machine to a new requesting user.

Although this service model allows multiple users to access virtual machines and the applications available thereon, each of the users may require a different set of applications. For example, an engineer of an organization may require a different set of applications than a financial officer of the same organization. To remedy this issue, previous solutions have provided for attaching application volumes to a virtual machine in response to a login by an end user. For example, a user of the service may initiate a login process to a virtual machine and, in response to the login process, application volumes associated with the particular end user may be attached to the virtual machine.

Once the application volumes are attached, the user may execute the applications located in the attached volume as if the applications were locally installed on the virtual machine. However, delaying the attachment of storage volumes until a user initiates a login process can cause frustration, as applications and data may not be immediately available to the end user upon completing the login process. Further, in situations where a large number of users are logging into the service at or around the same instance, processing resources to attach the application volumes may become saturated, causing a delay for some users as volumes are attached to virtual machines of other users also logging into the service.

Overview

The technology disclosed herein enhances how virtual machines are initiated for end users of a virtual service. In at least one implementation, a method of operating a virtual computing service that dynamically configures virtual machines with storage volumes as required for virtual sessions includes capturing a login history indicative of when a plurality of users login to a plurality of virtual machines using the virtual computing service. The method further provides identifying an anticipated login time for a subset of the plurality of users based on the login history and, for the subset of the plurality of users, identifying a configuration time that is earlier than the anticipated login time. The method also includes configuring a virtual machine at the configuration time for each user in the subset of the plurality of users by attaching at least one storage volume associated with the user to the virtual machine.

In some implementations, attaching the at least one storage volume to the virtual machine comprises attaching at least one application storage volume associated with the user to the virtual machine.

In at least one implementation, attaching the at least one application storage volume associated with the user to the virtual machine includes mounting the at least one application storage volume to the virtual machine, and modifying registry keys on the virtual machine to make at least one application on the application storage volume executable by the virtual machine.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 6 illustrates a data structure for maintaining login times for end users according to one implementation.

DETAILED DESCRIPTION

Figure 1:
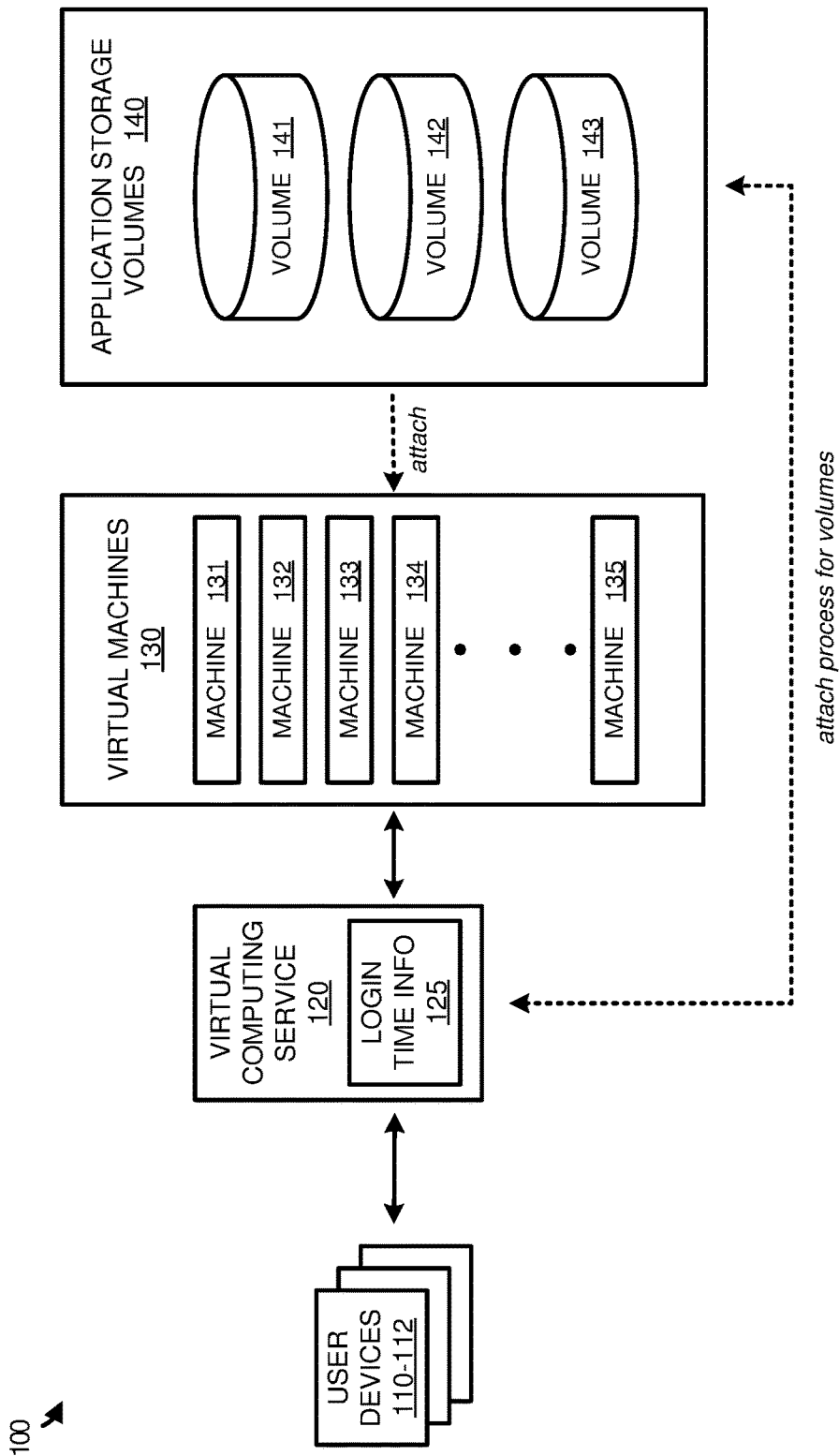
FIG. 1 illustrates a virtualization environment to provide virtual machines according to one implementation.

The various examples disclosed herein provide for configuring virtual machines in a virtual computing environment based on anticipated logins of end users. In many situations, virtual machines provide a centralized computing platform for one or more end users to access and execute desired applications and operations. To provide each of the end users with the required applications, and prevent access to unnecessary applications, one or more application storage volumes are made available in the virtual environment that are capable of being attached to the individual virtual machines. These application storage volumes may include, but are not limited to, virtual machine disks (VMDKs), virtual hard disks (VHDs), or some other virtual disk file capable of storing applications for execution on the virtual machines.

To make the applications available to each individual user, a virtual computing service may be employed that acts as a broker between the end users and the plurality of virtual machines, and further acts as a volume manager that initiates the attachment of application storage volumes to the individual virtual machines. For example, a user may, via an end user device, initiate a service login to initiate a virtual computing session. This service login may be accomplished using a dedicated application on the end user device, a web browser interface on the end user device, or any other similar interface on the end user device. Responsive to the service login, the virtual computing service may identify an available virtual machine to allocate to the end user, and initiate a user login process to log the end user into the virtual machine. Additionally, the service may identify one or more storage volumes associated with the user and attach the one or more storage volumes to virtual machine. Once attached and the user is logged into the virtual machine, the user may execute any of the applications from the attached storage volumes.

Here, to more effectively provide virtual machines when they are requested by the end users, the virtual computing service may capture a login history for users of the service, wherein the login history indicates when the users have logged to virtual machines using the virtual computing service. Based on the login history, the virtual computing service may identify an anticipated login time for a subset of users and identify a configuration time for the subset of users that is earlier than the anticipated login time. Once identified, the virtual computing service may configure a virtual machine for each user in the subset of users by attaching at least one storage volume associated with the user to the virtual machine. This at least one storage volume per user may comprise a user storage volume with user read/write files, or may comprise at least one application storage volume with readable files to execute the application on the virtual machine. By initiating the configuration of the virtual machines prior to the login of the end users, the virtual machines may be made more quickly available to the requesting users. In particular, the users may not be required to wait as the attach operations are completed for other virtual machines of the virtual environment. Further, in some implementations, the configuration time for the subset of users may permit the configuration to be completed for the subset of users prior to the anticipated login time. As a result, rather than waiting for the attach processes to be completed when a virtual machine is required, the subset of users may be provided with their preconfigured virtual machine.

To attach the application volumes to the virtual machine, the virtual computing service may initiate a process to mount the volumes to the allocated virtual machine for the end user, and overlay the contents of the volumes to make the one or more applications within the volumes executable by the virtual machine. In some examples, mounting a volume to the virtual machine may include providing an access path and mount point for the volume to the virtual machine, which may comprise an internet protocol (IP) address, a directory name, a file name, or any other path information to access the contents of the particular volume. Once mounted, the contents of the volume may be overlaid within the virtual machine to make the application executable. This overlaying may include modifying registry keys to make the application executable from the attached volume, as well as modifying the file system view to make the application appear as though it has been locally installed. For example, when an application storage volume is attached to a virtual machine, the files and directories for the application may appear in the "C:\Program Files" directory, although the executable file components remain stored in the attached volume.

In some implementations, administrators may manage and perform installation processes to store the applications in the application storage volumes. These installation processes may extract the necessary files and registry keys from an installer, and store the files and registry keys to an appropriate application storage volume. In some examples, the administrator may define application stacks, or groups of applications that are commonly assigned, and store these applications within a single application storage volume. For example, a first application storage volume may include productivity applications to be supplied to a first set of end users, and a second application storage volume may include video and image editing software to be provided to a second set of end users. Once the applications are stored within the application volumes, the administrator may define which of the applications or volumes are associated with each individual end user of the virtual environment.

Referring now to FIG. 1, FIG. 1 illustrates a virtualization environment 100 to provide virtual machines according to one implementation. Virtualization environment 100 includes user devices 110-112, virtual computing service 120, virtual machines 130, and application storage volumes 140. Virtual computing service 120 may comprise one or more computing devices capable of providing virtual machines to requesting end users. Virtual machines 130 include individual machines 131-135, although any number of virtual machines may be included within a virtualization environment. Virtual machines 131-135 may include an operating system, such as Microsoft Windows, and one or more locally installed applications or services. Application storage volumes 140 include volumes 141-143, which each store components for one or more applications. These components may include application files and registry keys required for each of the applications to execute.

In operation, virtual machines 131-135 execute on one or more host computing systems to provide a platform for users to access and execute centralized applications. In particular, users 110-112 may, via end user devices and a communication network, initiate a service login to virtual computing service 120 and, in turn, be provided with a remote desktop view of a particular virtual machine. For example, virtual computing service 120 may identify a session initiation request from user 110 for a virtual machine. Responsive to the request, virtual computing service 120 may identify a virtual machine in virtual machines 130 to be provided to the user, and initiate a login process to the particular virtual machine. Once the login process to the virtual machine is complete, the user may be provided a remote desktop view of the virtual machine via the end user device, which may comprise a desktop computer, laptop computer, tablet computer, or some other similar end user device.

Here, in addition to the locally installed applications of the virtual machines, one or more applications may be attached to a virtual machine based on the credentials associated with the requesting end user. For example, a requesting user may include credentials that provide the user with productivity applications, such as word processing applications, spreadsheet applications, presentation applications, and the like. As a result, when the virtual computing service 120 identifies a session request from an end user, virtual computing service 120 will identify a virtual machine for the end user, and initiate attachment of one or more volumes 141-143 from application storage volumes 140 that contain the required productivity applications.

To attach the volumes to the virtual machine, virtual computing service 120 may initiate a process to mount the volumes to the virtual machine, and overlay the contents of the volumes to make the one or more applications within the volumes executable by the virtual machine. In some examples, mounting the volumes to the virtual machine may include providing an access path or mount point for the volume to the virtual machine. This access path may include an internet protocol (IP) address, a directory name, or any other path information to access the contents of the particular volume. Once mounted, the contents of the volume may be overlaid within the virtual machine to make the application executable. For example, registry keys may be updated in the virtual machine to reflect the applications available in the attachable volumes, and application files and directories may be made available for operation within the virtual machine. In some implementations, the directories and files for the application may be overlaid in an application storage location for the file system. For example, in a Microsoft Windows virtual machine, directories and files for the attached applications may appear visible in the "C:\Program Files" directory, although the executable file components are stored in the attached volume.

In the present example, in addition to attaching the application volumes at the time of logins by the end users at end user devices 110-112, virtual computing service 120 further maintains login time information 125, which is indicative of when end users have logged in and requested virtual computing sessions. Based on the information, virtual computing service 120 may initiate the configuration and attachment of storage volumes on virtual machines for users ahead of anticipated login times. Thus, rather than requiring the end users to wait for the attachment process to complete, the process may be initiated, and sometimes completed, prior to a user login.

Figure 2:
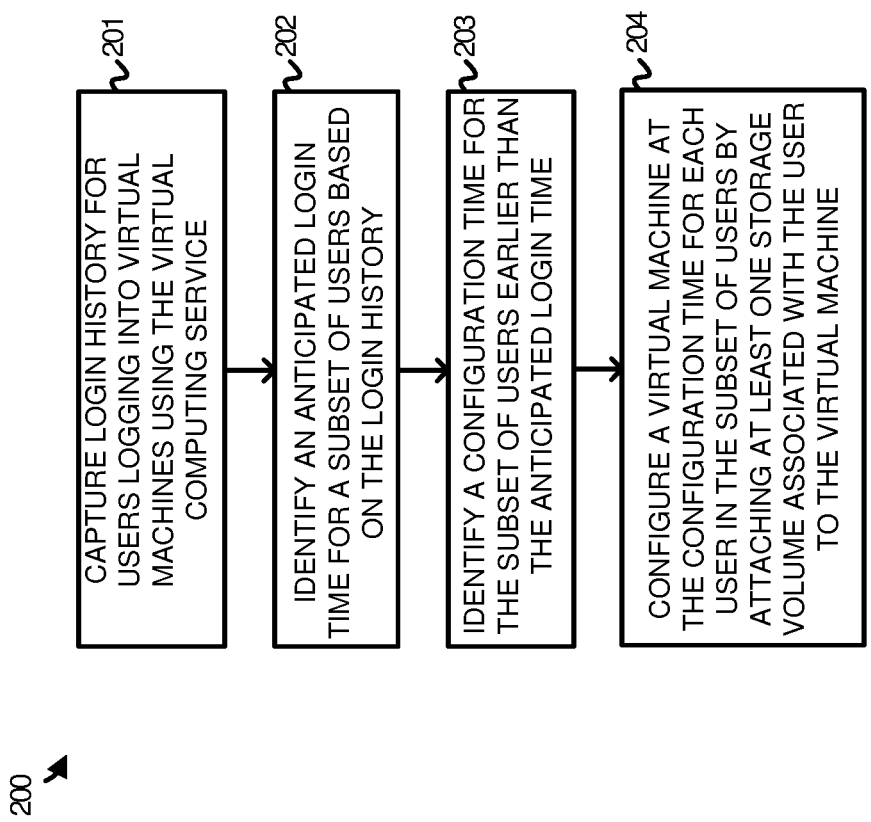
FIG. 2 illustrates a method of operating a virtual computing service to configure virtual machines according to one implementation.

To further demonstrate the operation of virtual computing service 120, FIG. 2 is provided. FIG. 2 illustrates a method 200 or operating a virtual computing service to configure virtual machines according to one implementation. The operations of FIG. 2 are referenced parenthetically in the paragraphs that follow, along with references to the elements and systems from virtualization environment 100 of FIG. 1.

As described herein, virtualization environment 100 includes a plurality of virtual machines that can be used by end users to perform desired tasks. However, the virtual machines are not persistent to each individual user, and are assigned to the user only when the user requires a virtual computing session. To provide the virtual sessions, virtual computing service 120 captures login history information 125 for user logging into virtual machines using virtual computing service 120 (201). This login history indicates when each of the users at user devices 110-112 login to virtual computing service 120 for a virtual session. For example, login history information 125 may include timestamps indicating when credentials, such as usernames and passwords, are provided from end users to virtual computing service 120.

As the login history is captured, method 200 further includes identifying an anticipated login time for a subset of one or more users based on the login history (202). For instance, if a user typically provided login credentials at an average of eight o'clock, then an anticipated login time for the user may be determined as eight o'clock. In some implementations, to determine the anticipated login time for the subset of users, virtual computing service 120 may monitor the average login time for the subset of the end users, the standard deviation of the login times for the subset of the end users, or some other similar login factor, including combinations thereof. Consequently, to define the subset of users, even if five users had an average login time of eight o'clock, virtual computing service 120 may not include one or more of the users in the subset if the users do not meet predictability criteria. For example, one of the users may not qualify for the subset if the standard deviation for the login time is too large, or there are too many outlier login times to make the eight o'clock predication for the user.

In addition to determining the anticipated login time for the subset of one or more users, method 200 further includes identifying a configuration time for the subset of users earlier than the anticipated login time (203). In some examples, configuring virtual machines for a plurality of users by attaching storage volumes may take an undesirable amount of time when multiple virtual machines are configured at or around the same instance. Thus, rather than waiting for the users to login into the service to initiate the configuration of a virtual machine, the configuration time determined for the subset of one or more users may permit the configuration of the virtual machine to begin at a time prior to the user login. In some implementations, the identified configuration time may permit the virtual machines to complete configuration and attachment of storage volumes prior to the anticipated login time. However, in other examples, the configuration time may comprise any other time earlier than the anticipated login time that reduces the wait for the subset of end users to receive a configured virtual machine.

Once the configuration time is determined, method 200 includes configuring a virtual machine at the configuration time for each user in the subset of users by attaching at least one storage volume associated with the user to the virtual machine (204). These storage volumes may include user volumes that can be read and written to, and may further include application storage volumes that are read only, and capable of being attached to multiple virtual machines at any given instance. For example, multiple user virtual machines may require access to productivity applications. Thus, a storage volume with the productivity applications may be attached to each of the virtual machines, permitting the users of the virtual machines to execute the required applications.

In some implementations, attaching the application storage volumes may comprise mounting the identified application storage volumes to the virtual machine, and overlaying the contents of the application storage volumes into the virtual machine to make the application executable. By mounting the application to the virtual machine, the virtual machine is provided an access path to the components of the application, wherein the components may include the registry keys and files required to make the application executable. Once attached, the contents of the volume may be overlaid in the virtual machine. This overlaying may include modifying the registry keys of the virtual machine to include the registry keys for the application and may further include, in some examples, making the application files appear as though they have been locally installed within the virtual machine. Thus, using a Microsoft Windows virtual machine as an example, the files and directories for the application may appear within the "C:\Program Files" directory, despite the location of the executables remaining in the application storage volume. As a result of the overlaying, when the user selects an application within the C: drive, the selection may be identified in the virtual machine, and the proper executable files will be executed from the application storage volume attached to the virtual machine.

After configuring the virtual machines at the configuration time for the subset of end users, a user in the subset may initiate a login into virtual computing service 120 using one of user device 110-112. Instead of initiating the configuration of a new virtual machine, virtual computing service 120 will identify a virtual machine that is being or has been configured for the end user, and provide the user with a virtual session using the identified virtual machine. In some implementations, in addition to the users within the subset, other users of virtual computing service 120 may also provide login credentials after the configuration time. In that example, virtual computing service 120 will identify that a virtual machine has not be preconfigured for the user, and will initiate the configuring of a new virtual machine for the requesting user. This configuring of a new virtual machine may include allocating an idle virtual machine to the requesting user, and attaching required storage volumes to the virtual machine. In other implementations, the configuring may include powering on a new virtual machine and attaching required storage volumes to the virtual machine. This attach process may include mounting, via a hypervisor for the virtual machine, the required storage volumes, and modifying any registry keys to make application files in the storage volumes executable via the virtual machine.

In some implementations, although a virtual machine may be configured prior to an anticipated login for an end user, the end user may not login within a predefined time period. For example, if an anticipated login for a user was eight o'clock and the user had not logged in by nine o'clock, then virtual computing service 120 may desire to make the virtual machine available for another user. To make the virtual machine available, virtual computing service 120 may detach any storage volumes associated with the end user, permitting storage volumes with the second user to be attached when the second user requires a virtual machine.

Figure 3:
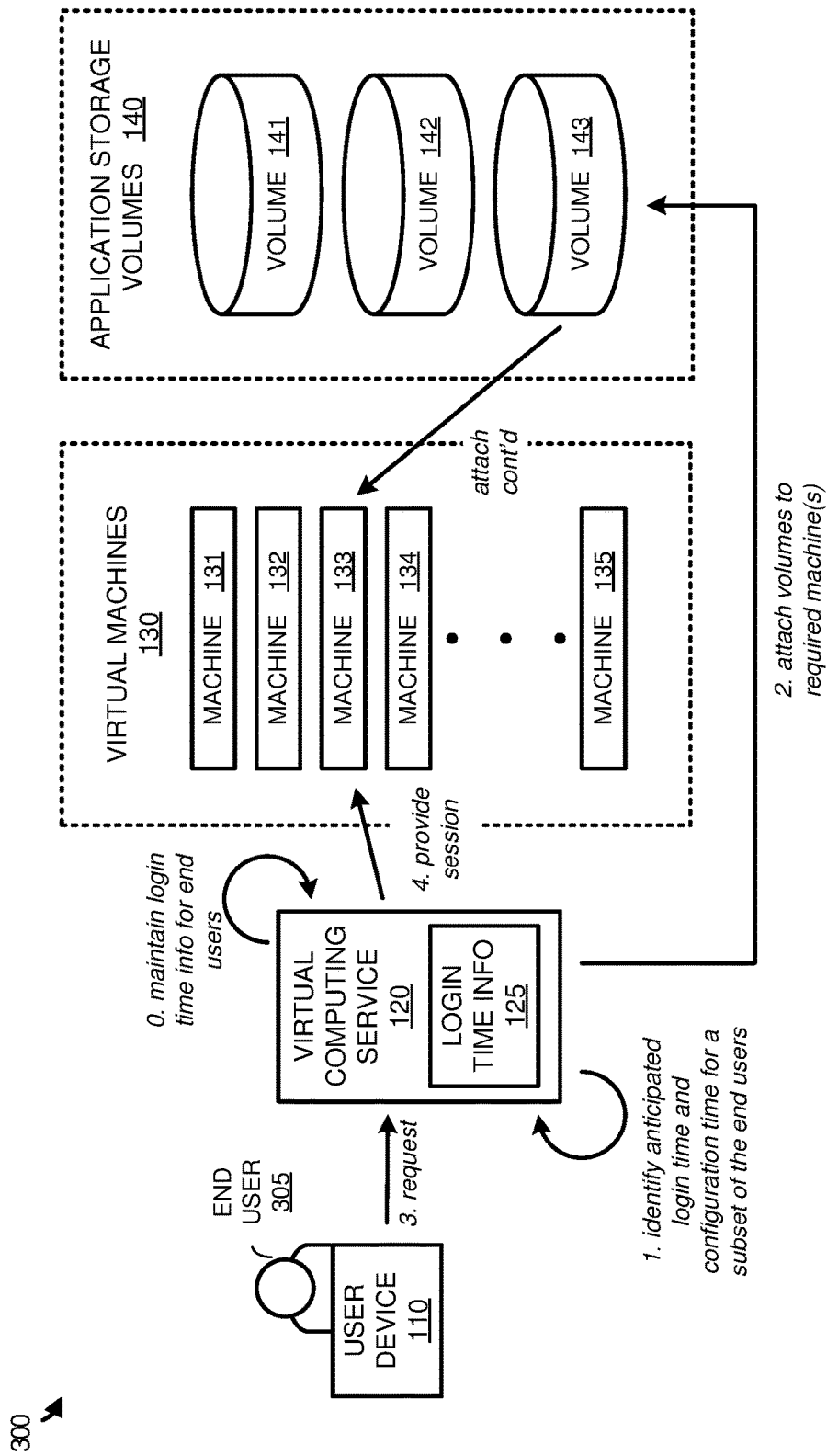
FIG. 3 illustrates an operational scenario of configuring at least one virtual machine based on an anticipated login for a user according to one implementation.

Referring now to FIG. 3, FIG. 3 illustrates an operational scenario 300 of configuring at least one virtual machine based on an anticipated login for a user according to one implementation. Operational scenario 300 includes systems and elements from virtualization environment 100 of FIG. 1, and further includes end user 305.

As depicted, virtual computing service 120, at step 0, maintains login time information 125 for end users associated with virtual computing service 120, wherein the login time information is indicative of when the users login to virtual machines using virtual computing service 120. This login time information may include time stamps and date indicators of when each of the user logins occurs, and may further include any other relevant timing information for the user logins. As the information is collected, virtual computing service 120 identifies, at step 1, an anticipated login time and a configuration time for a subset of the end users, wherein in the present example, the subset of users comprises end user 305. Once the configuration time is determined, which occurs prior to the anticipated login time for end user 305, virtual computing service, at step 2, configures and attaches storage volumes at the configuration time to a virtual machine for end user 305. In particular, virtual computing service 120 identifies machine 133 for end user 305 and attaches, in some examples using a hypervisor for machine 133, volume 143 to virtual machine 133. Volume 143 may include one or more applications required by end user 305 during a virtual session. Machine 133 may comprise an idle virtual machine that has not been allocated to any other user, or may comprise a powered down virtual machine that is powered on by a hypervisor to be allocated to end user 305.

To attach volume 143 to virtual machine 133, virtual computing service 120 may identify credentials associated with end user 305 and identify applications and application volumes to attach to the virtual machine based on the credentials. Once the volumes are determined, the volumes are mounted to the particular virtual machine, and registry keys in the virtual machine are modified permitting the applications on volume 143 to be executable on the virtual machine. Further, in some implementations, the files, such as executable files, .dll files, and other similar files may be overlaid into the file system view of the virtual machine. Accordingly, the applications files located on volume 143 may appear as though they have been locally installed in an application directory for virtual machine 133, although files remain as read only files on volume 143.

After the configuration time and configuring virtual machine 133 by attaching volume 143, end user 305 transfers, at step 3, a login request to virtual computing service 120 using user device 110. In response to the request, virtual computing service 120 identifies that a virtual machine is already allocated to end user 305, and provides, at step 4, a virtual session to end user 305. This providing of the virtual session may include providing addressing information and security credentials, permitting user device 110 to remotely access virtual machine 133.

In some implementations, the attach process of volume 143 to virtual machine 133 may be completed prior to the login request from end user 305. Such may be the case when the configuration time is allocated to ensure that the virtual machine is ready for the user by the anticipated login time. In other implementations, the attach process of volume 143 to virtual machine 133 may be ongoing when the user logs in to virtual computing service 120. However, although the user may be required to wait for the attach process to complete, the wait time may be less than if the configuration and attachment occurred when the user logged into the virtual service.

Although illustrated in the example of FIG. 3 with application volumes, it should be understood that similar operations may be used with user specific data volumes. These volumes, which may comprise read/write permission volumes, may be attached my mounting the user volume to the virtual machine. Further, any files, such as word documents, spreadsheets, or any other similar user files may be overlaid into the file system view of the virtual machine such that the user files appear as though they have been stored locally on the virtual machine instead of on the attached user volume.

Figure 4A:
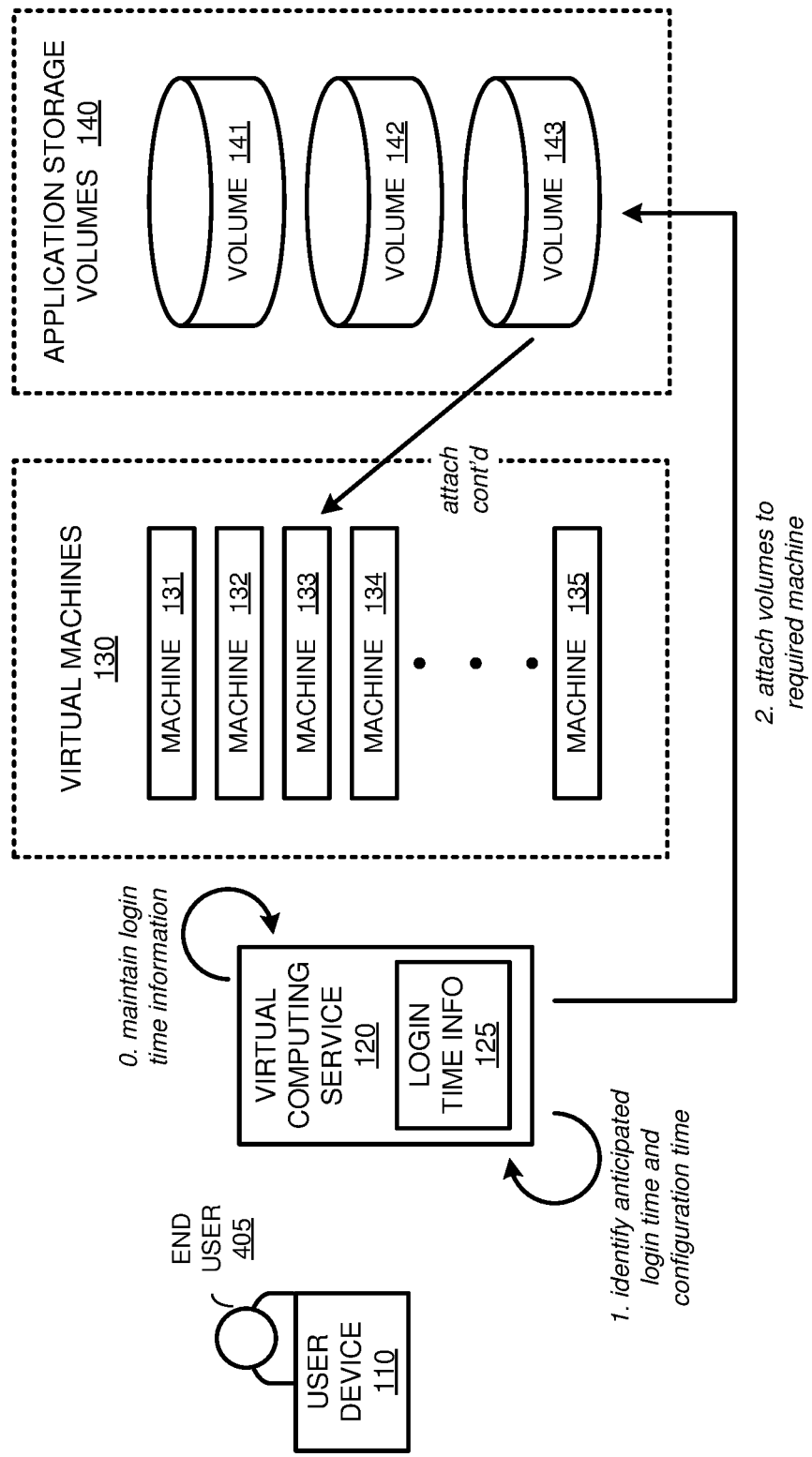
FIGS. 4A, 4B, and 4C illustrate an operational scenario of allocating a virtual machine to an end user and a deallocating the virtual machine to the end user according to one implementation.
Figure 4B:
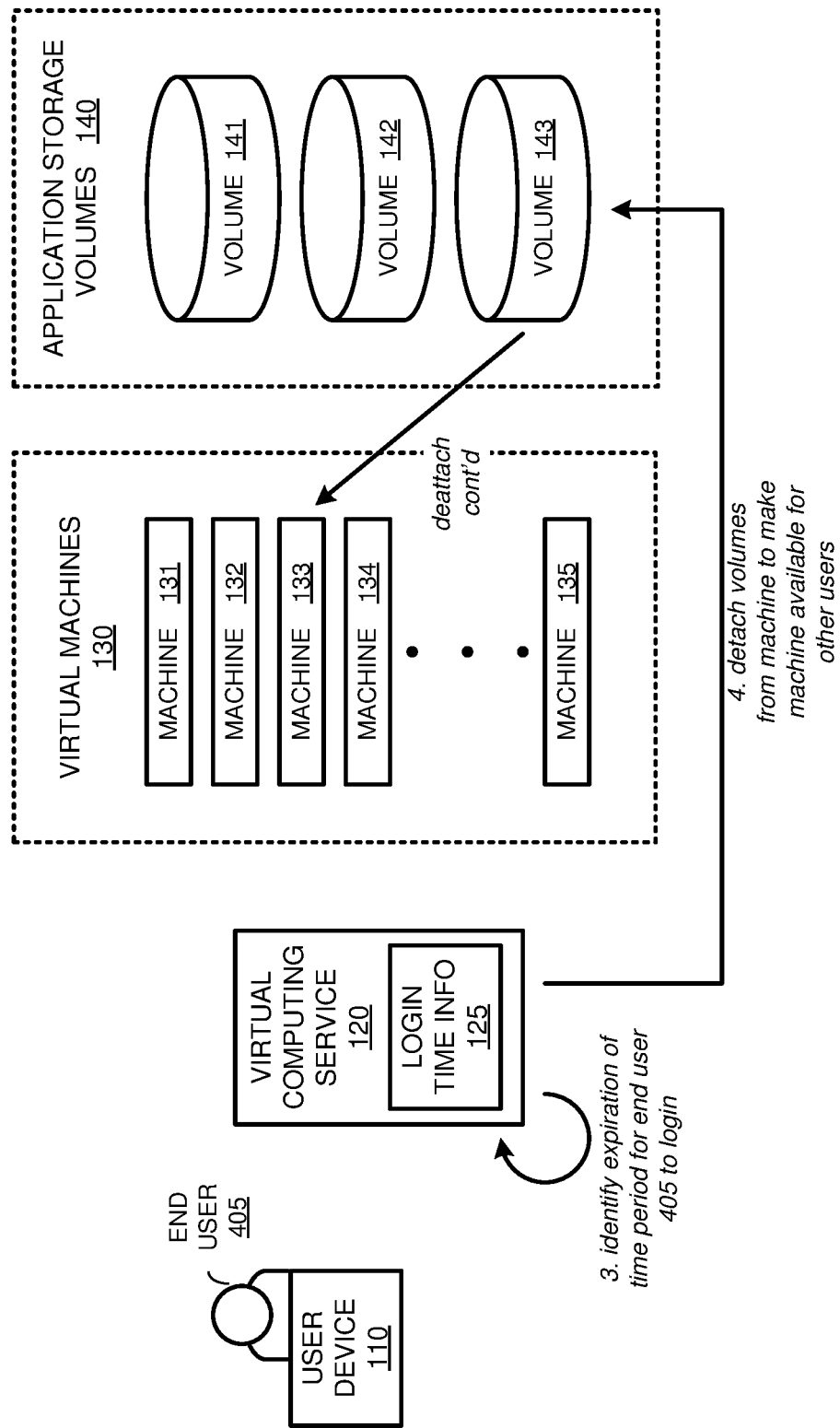
Figure 4C:
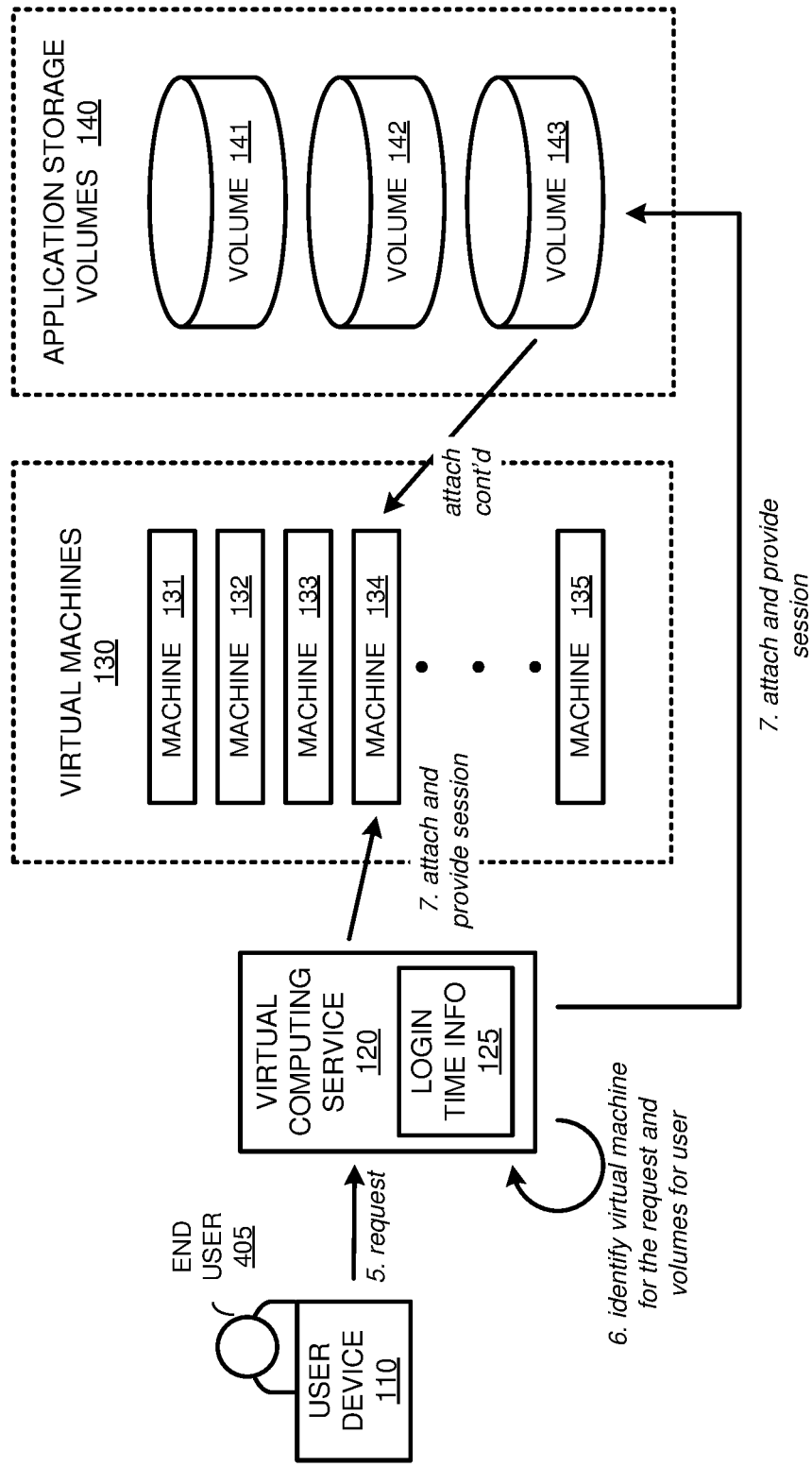

FIGS. 4A, 4B, and 4C illustrate an operational scenario of allocating a virtual machine to an end user and deallocating the virtual machine to the end user according to one implementation. The operational scenario in FIGS. 4A, 4B, and 4C include systems and elements from virtualization environment 100 of FIG. 1, and further includes end user 405.

Referring first to FIG. 4A, virtual computing service 120, at step 0, maintains login time information 125 for end users associated with virtual computing service 120, wherein the login time information is indicative of when the users login to virtual machines using virtual computing service 120. This login time information may include time stamps and date indicators of when each of the user logins occurs, and may further include any other relevant timing information for the user logins. As the information is collected, virtual computing service 120 identifies, at step 1, an anticipated login time and a configuration time for a subset of the end users, wherein in the present example, the subset of users comprises at least end user 405. Once the configuration time is determined, which occurs prior to the anticipated login time for end user 405, virtual computing service, at step 2, configures and attaches storage volumes at the configuration time to a virtual machine for end user 405. In particular, virtual computing service 120 identifies machine 133 for end user 405 and attaches volume 143 to virtual machine 133. Volume 143 may include one or more applications required by end user 405 during a virtual session. Machine 133 may comprise an idle virtual machine that has not been allocated to any other user, or may comprise a powered down virtual machine that is powered on by a hypervisor to be allocated to end user 405.

To attach volume 143 to virtual machine 133, virtual computing service 120 may identify credentials associated with end user 405 and identify applications and application volumes to attach to the virtual machine based on the credentials. Once the volumes are determined, the volumes are mounted to the particular virtual machine, and registry keys in the virtual machine are modified permitting the applications on volume 143 to be executable on the virtual machine. Further, in some implementations, the files, such as executable files, .dll files, and other similar files may be overlaid into the file system view of the virtual machine. Accordingly, the applications files located on volume 143 may appear as though they have been locally installed in an application directory for virtual machine 133, although files remain as read only files on volume 143.

Turning to FIG. 4B, virtual computing service 120 monitors a period of time that the virtual machine should remain available. For example, if end user 405 had an expected login time of eight o'clock in the morning, the virtual computing service 120 may maintain the allocation of machine 133 for a predefined period following the expected login time. Virtual computing service 120 is then configured to identify, at step 3, the expiration of the time period for end user 405 to login to virtual computing service 120. In response to the identification, virtual computing service 120 initiates the deallocation of virtual machine 133 to end user 405, at step 4. In particular, this deallocation may include detaching volumes associated with end user 405 to permit the virtual machine to be allocated to other end users. Here, because volume 143 was attached (mounted with registry keys modified in virtual machine 133), virtual computing service 120 may trigger volume 143 to be unmounted from virtual machine 133 and the registry files be returned to the form prior to attachment of the volume.

Turning to FIG. 4C, FIG. 4C illustrates the operation of allocating a virtual machine to end user 405 when no virtual machine has been preconfigured for the user. Here, at step 5, end user 405 generates a request via user device 110 for a virtual machine provided by virtual computing service 120. Because virtual computing service 120 previously deallocated virtual machine 133 for end user 405 at step 4, virtual computing service 120 identifies, at step 6, a new virtual machine for end user 405 and identifies the required storage volumes associated with the end user 405. Once identified, virtual computing service 120 attaches, at step 7, the required virtual machines and provides the requested virtual session to end user 405. To provide the virtual session, virtual computing service 120 may provide addressing and other credential information to access the appropriate virtual machine.

Here, end user 405 was initially allocated virtual machine 133 at the configuration time, but failed to login within an appropriate period following the anticipated login time. Consequently, volume 143 was detached from virtual machine 133 to make the machine available to other users. Once end user 405 did provide the login request, virtual computing service 120 identified a new virtual machine 134 to support the request, and attached volume 143 to the virtual machine to support the user's operations.

Although not illustrated in FIGS. 4A-4C, it should be understood that in addition to, or in place of the application storage volumes, user volumes may be attached to the required virtual machine. In particular, where the application volumes may comprise read only volumes that can be shared by a plurality of users, the user volumes may permit the user to read and write data to the storage volumes, and may further belong solely to the individual user. Further, while illustrated in the examples of FIG. 4A-4C as receiving a login from a user with an anticipated login time, it should be understood that when users without an anticipated login transfer a login request, similar operations to those described in FIG. 7C may be used to provide the user with the required virtual machine.

Figure 5:
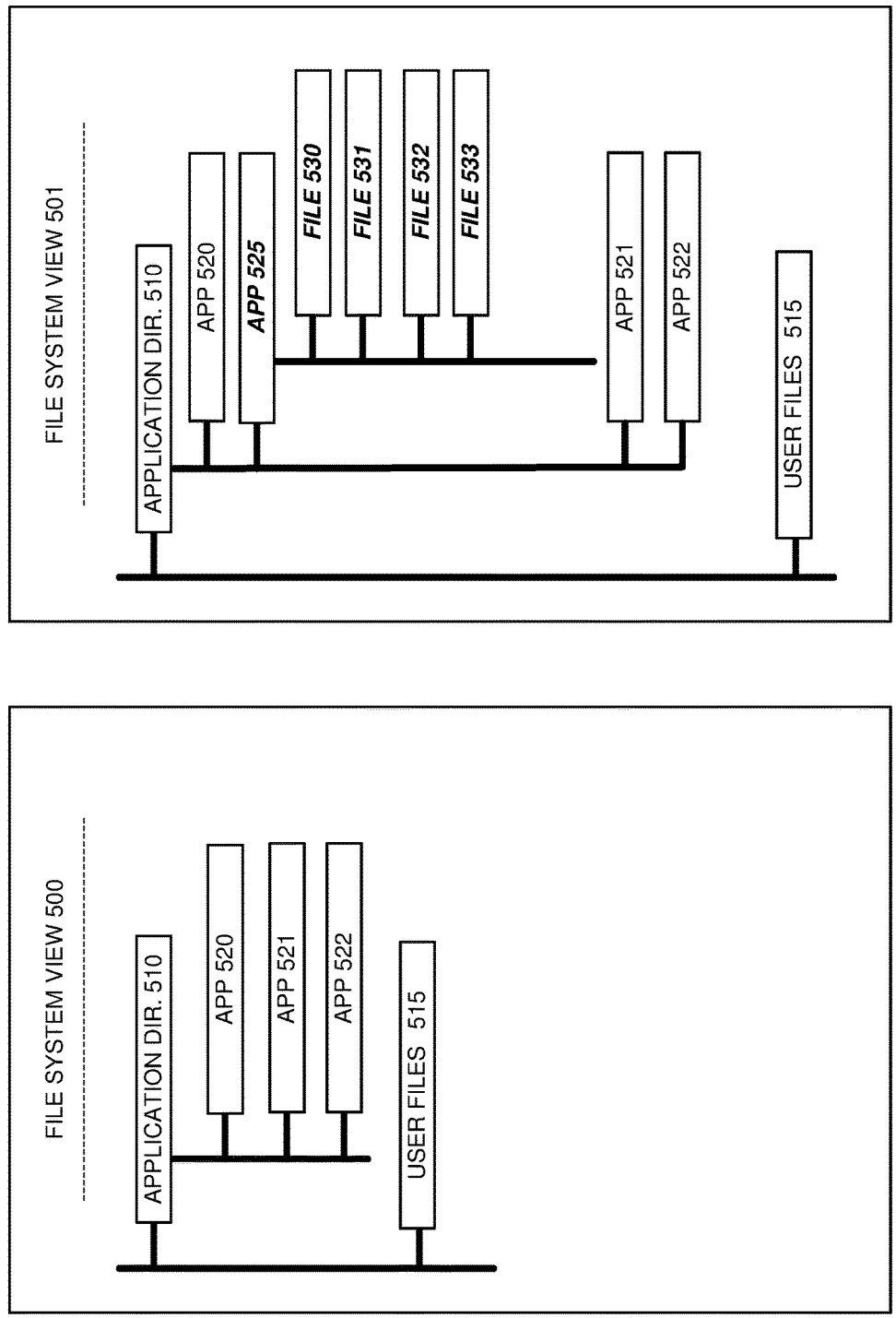
FIG. 5 illustrates file system views of a virtual machine according to one implementation.

FIG. 5 illustrates file system views of a virtual machine according to one implementation. In particular, FIG. 5 illustrates file system view 500 of a virtual machine prior to the attachment of an application storage volume, and file system view 501 of the virtual machine after the attachment of an application storage volume.

As depicted prior to the attachment of an application storage volume, a virtual machine may have a user files directory 515, and three locally installed applications 520-522 within application directory 510. These applications may provide various operations including productivity operations, image or video editing operations, or any other similar application operation on a virtual machine.

As the virtual machine operates as part of a virtual computing service, the service may allocate a user to the virtual machine. This allocation may come when the user logs into the service, or may come at a configuration time prior to an expected login by a user, permitting the virtual machine to be ready quicker for the associated end user. As illustrated in file system view 501, when a user is allocated a virtual machine, application storage volumes may be attached to the virtual machine, permitting the specific end user the ability to execute the applications. To attach the virtual machine, the virtual computing service or an agent within the virtual machine, may trigger a mounting operation by a hypervisor to provide an access path to the application storage volume. Once the access path is provided to the virtual machine, registry keys may be modified or updated to reflect the newly available applications from the storage volume. Further, as demonstrated in file system view 501, folders and files for the application may be overlaid within the file system view that is presented to the end user. Accordingly, rather than appearing as a separate storage volume to the user, the files for the user specific application will appear as though they have been installed locally. In particular, file system view 501 displays application 525 with files 530-533 for the end user virtual machine.

Although appearing as though the application has been locally installed in the application directory for the virtual machine, it should be understood that the applications and associated files within application directory 510 are pointers to the physical files that are located on the mounted volume. Thus, if the user selected to execute application 525 on the virtual machine, the application files would be executed from the attached storage volume, which may comprise a VHD, VMDK, or some other similar storage volume.

FIG. 6 illustrates a data structure 600 for maintaining login times for end users according to one implementation. Data structure 600 includes user identification (ID) column 610 and time columns 621-623. Although illustrated as a table in the present implementation, it should be understood that data structure 600 may comprise a data tree, a linked list, or some other data structure capable of capturing login times for end users of a virtual computing service. Data structure 600 is an example structure of login time information 125.

As described previously, a virtual computing service may capture or maintain login time information for end users of the virtual computing service. To capture this information, the service may maintain profiles using data structure 600, which relates each individual user to previous times in which the user has logged in. Based on the times in data structure 600, the virtual computing service may identify one or more end users associated with a predicted login time. For example, if users 611-613 all logged in at or around eight o'clock in the morning based on times in time columns 620-623, then a predicted login time for users 611-613 may be identified as eight o'clock.

Once the predicted login time is determined for the set of one or more users, the virtual computing service then initiates a configuration of virtual machines for the set of one or more users. This configuration may include allocating idle virtual machines to the set of users, starting one or more virtual machines for the end users, or some combination thereof. Further, the virtual computing service will attach volumes associated with each of the users to the appropriate virtual machine, wherein the volumes may include user volumes capable of being read and written to, as well as application storage volumes capable of read only access and execution in multiple virtual machines.

Although illustrated in the example of FIG. 6 with four time columns for user logins, it should be understood that any number of columns or data points for the end users may be used in determining the predicted login time. Further, it should be understood that a variety of methods and operations may be used to determine a predicted login time for a user. This may include the most often login time of the user, the average login time for the user, the standard deviation of the login times for the user, or any other similar measure for the user, including combinations thereof. Further, in some implementations, in determining the predicted login time for a particular user, the user may be required to meet predictability criteria. These predictability criteria may prevent users with unpredictable login times from being provided with a preconfigured virtual machine. For example, if a user had a large standard deviation in login time, the virtual computing service may identify that the standard deviation fails to meet predictability criteria and, consequently, fail to identify a predicted login time for the user.

Figure 7A:
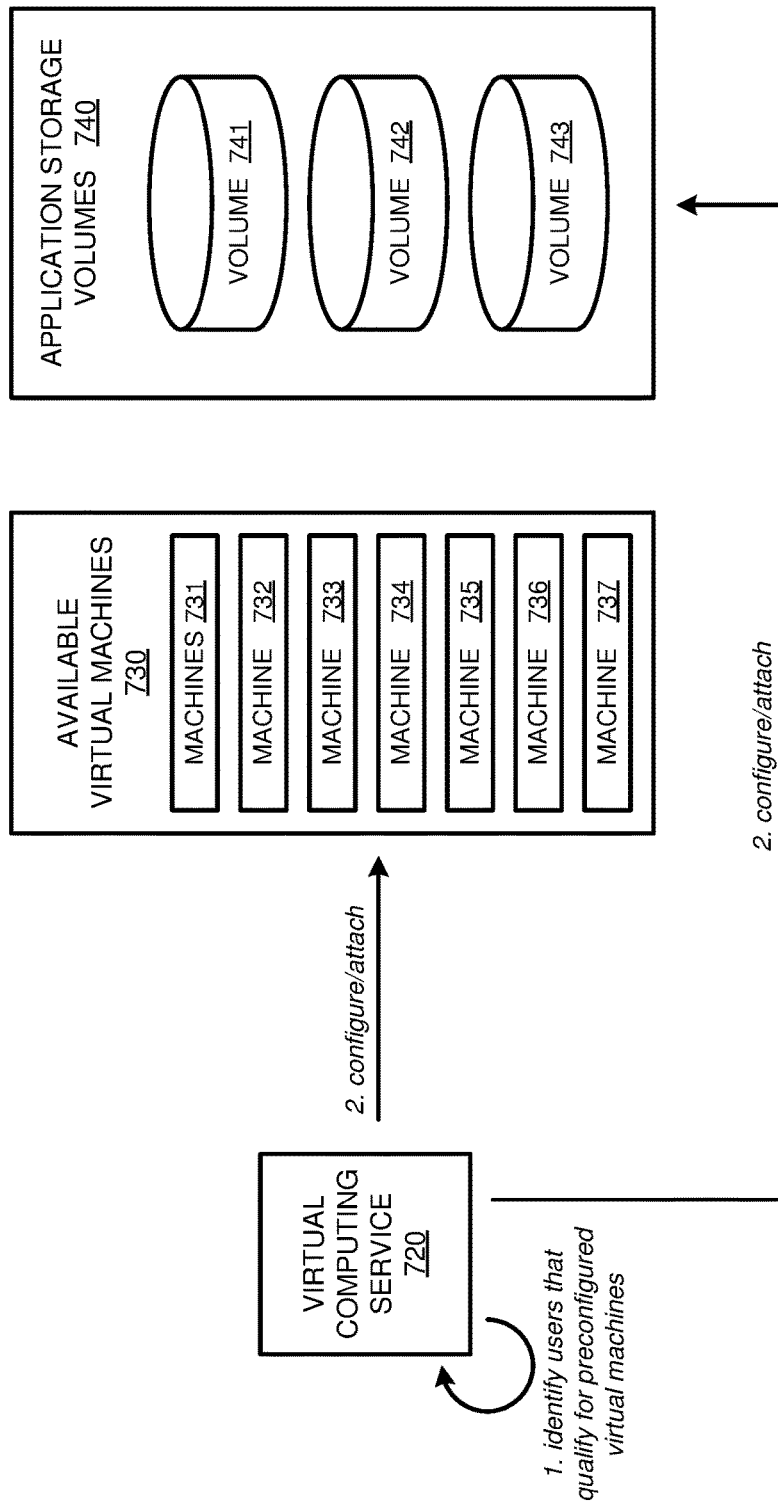
FIGS. 7A and 7B illustrate an operational scenario of configuring multiple virtual machines for end users based on an anticipated login for end users according to one implementation.
Figure 7B:
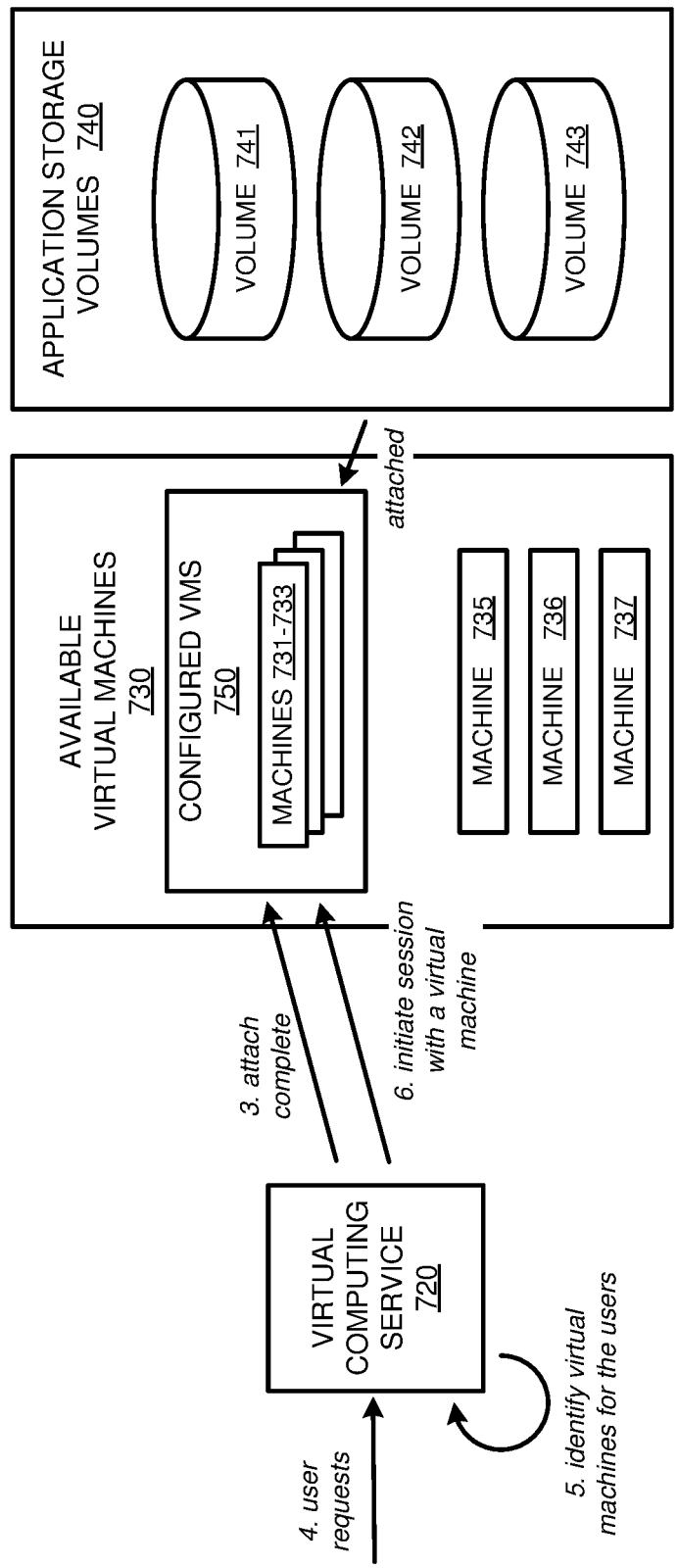

FIGS. 7A and 7B illustrate an operational scenario of configuring multiple virtual machines for end users based on an anticipated login for end users according to one implementation. FIGS. 7A and 7B include virtual computing service 720, available virtual machines 730 with virtual machines 731-737, and application storage volumes 740 with storage volumes 741-743.

Referring first to FIG. 7A, virtual computing service 720, at step 1, identifies users that qualify for a predicted login time based on login history information captured by virtual computing service 720. This login history may include information about times when each of the users have logged into virtual computing service 720 for a virtual machine. The login history information may, in addition to or in place of the login times to the computing service, maintain information about when users arrive for work, when users are required to be on a specific application, or any other similar information regarding the computing access routine for the users, including combinations thereof.

Once the predicted login time is determined for a set of end users, a configuration time is determined that is earlier you than the predicted login time. Here, the configuration time is determined based on the estimated configuration time for virtual machines to support the set of end users. For example, if the predicted login time were nine o'clock and it is estimated that it will take thirty minutes to configure the virtual machines for the set of end users, then the configuration time for the end users would be eight thirty. After the configuration time is determined, at step 2, virtual computing service 720 initiates the configuration and attachment of volumes to the required virtual machines at the configuration time. In the particular. Example, virtual computing service 720 initiates the configuration and attachment of storage volumes to virtual machines 731-733, as further illustrated in FIG. 7B.

Turning to FIG. 7B, at step 3, the attach process is completed for application storage volumes 740 to virtual machines 731-733. In some implementations, virtual machines 731-733 may share one or more volumes, however, in other examples, virtual machines 731-733 may fail to share a common volume. After the configuration is complete, virtual computing service 720 receives user requests or logins from end user devices, at step 4. In response to the logins, virtual computing service 720 identifies, at step 5, virtual machines associated with the users making the requests, wherein the identification may be based on credentials supplied by the user during the login process. Here, the login requests are for users associated with the predicted login time. As a result, virtual computing service identifies virtual machines in configured virtual machines (VMs) to support their request. Once identified, virtual computing service initiates, at step 6, a session for each of the requests with the required virtual machine by supplying connection information to the required virtual machine.

Despite being illustrated in FIGS. 7A and 7B as completing the configuration process prior to the user logins, it should be understood that in some implementations, the configuration process may be ongoing while the users login to virtual computing service 720. For example, if a predicted configuration time was not determined for the users associated with virtual machines 731-733, the users may be required to wait as the virtual machine configuration is completed. However, because the configuration time occurs prior to the anticipated login, the virtual machines would be ready sooner than if the configuration and attachment were initiated by the user login.

Figure 8:
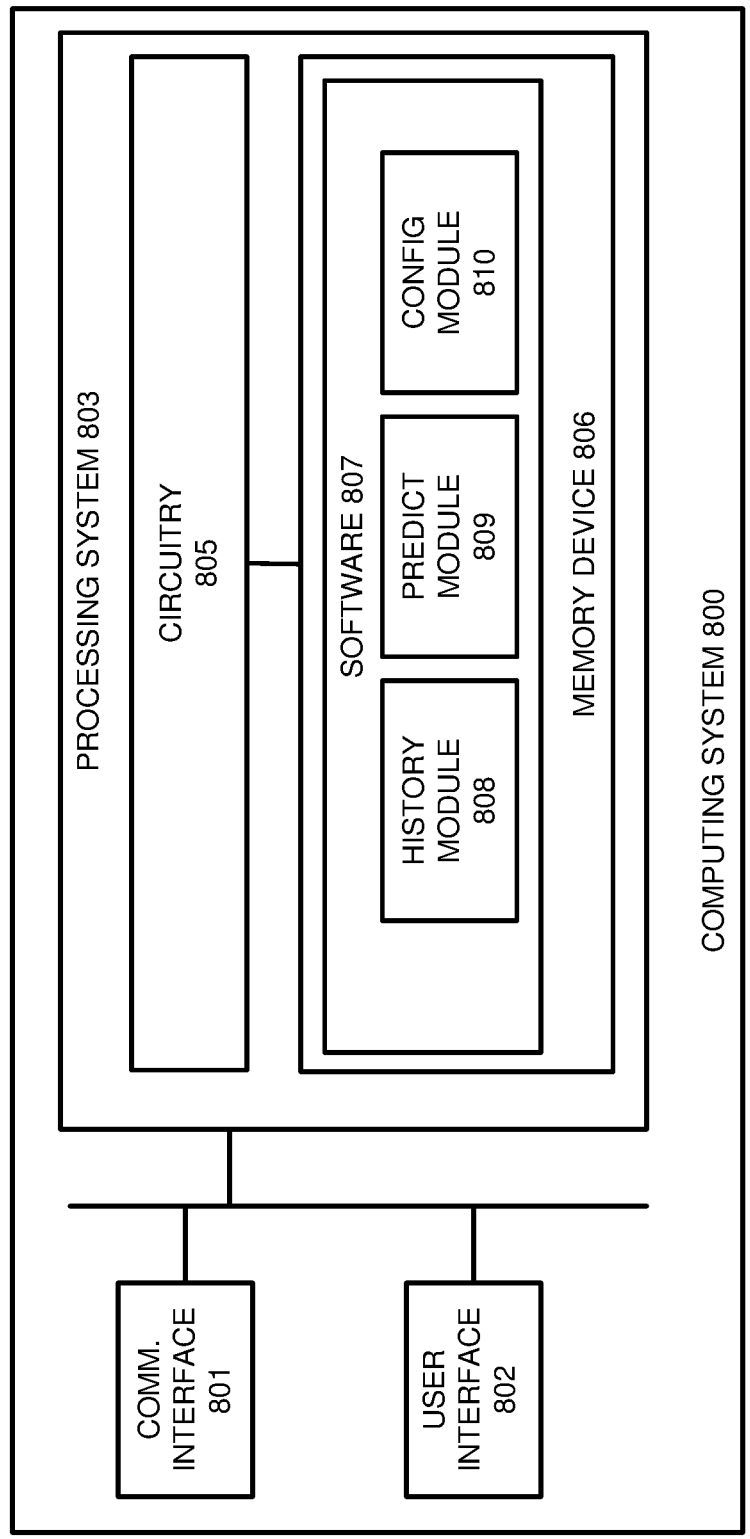
FIG. 8 illustrates a computing system for providing virtual computing services according to one implementation.

FIG. 8 illustrates a computing system 800 that is representative of any device or system of devices to implement the virtual computing service operations in FIGS. 1-7, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity. Computing system 800 may be a personal computer, server, or some other computing apparatus—including combinations thereof.

Communication interface 801 comprises components that communicate over communication links, such as network cards, ports, radio frequency (RF) transceivers, processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In some implementations, communication interface 801 may be configured to communicate with a plurality of end user devices via the internet or some other communication network, and connect the end user devices to one or more host systems that provide a platform for a plurality of virtual machines.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes history module 808, predict module 809, and configuration (config) module 810, although any number of software modules may provide the same operation. Operating software 807 may further include an operating system, utilities, drivers, network interfaces, applications, or some other type of software. When executed by processing circuitry 805, operating software 807 directs processing system 803 to operate computing system 800 as described herein.

In particular, history module 808 directs processing system 803 to capture login history information related to login times of end users requesting virtual sessions over computing system 800. As the login history information is captured, predict module 809 directs processing system 803 to identify a predicted login time for a subset of one or more users based on the login history information. Once the predicted login time is determined, configuration module 810 directs processing system 803 to identify a configuration time that is earlier than the predicted or anticipated login time for the subset of the end users. In some implementations, the configuration time may be based on a predicted configuration duration for the subset of users. For example, if the predicted configuration duration were thirty minutes, then the configuration time for the subset of devices may be thirty minutes or more before the anticipated login time for the subset of devices. In some implementations, in determining the anticipated login time for the subset of devices various factors may be considered based on the login history information. These factors may include, but are not limited to, the average time that users login to the service, the standard deviation of the login times for a user, the median login times for a user, or the most often occurring times for the user. Further, in some examples, the login history information may also include other work habit information for the end users that use computing system 800. These habits may include, when the users access the work place using a key fob or other security device, when the users phone or other device is located within a defined work area, or other similar information which may be used as a trigger similar to a login.

Once the configuration time is determined for the subset of the end users, configuration module 810 further directs processing system 803 to configure a virtual machine for each end user in the subset of the end users by attaching at least one storage volume associated with the user to the virtual machine. For example, a first user in the subset may require productivity applications, while a second end user may require image and video editing applications. Consequently, first volumes may be identified for the first user that support the productivity applications, while second volumes are identified for the second user to support the image and video editing applications.

In some implementations, to configure the virtual machines, computing system 800 may be configured to start virtual machines that are powered down, however, in other implementations, computing system 800 may allocate idle virtual machines that are not associated with any users to the subset of users. Once a virtual machine is allocated for a particular user, storage volumes associated with the user may be attached to the virtual machine using procedures described herein. In particular, computing system 800 may communicate with a hypervisor for the virtual machine to mount the required storage volumes for the user to the virtual machine. This mounting process may include providing an access path and mount point for the volume to the virtual machine, which may comprise an IP address, a directory name, a file name, or any other path information to access the contents of the particular volume. Once the storage volume is mounted to the user's virtual machine, registry keys on the virtual machine may be modified to make any applications available on the volumes executable by the virtual machine. Further, pointers for directories, folders, and files located on the storage volumes may be overlaid into a file system view on the virtual machine to appear to the user as though they have been stored locally on the virtual machine. For example, in the case of an application, pointers to folders and executable files may be placed within an application directory on the virtual machine to make the application appear as though it has been locally installed.

In some examples, a virtual machine that is configured based on the anticipated login time may also be provided an expiration period. Accordingly, if the user does not log into the virtual computing service within the expiration period, the virtual computing service may deallocate the virtual machine, permitting the machine to be used by other users of the service. This deallocation includes detaching the storage volumes associated with the user, wherein detaching includes unmounting the storage volumes, and reverting the file system view and registry keys to a state before the volumes were attached.

Referring back to the elements of FIG. 1, end user devices 110-112 may include desktop computers, laptop computers, tablet computers, smartphones, or other similar end user devices, including combinations thereof. The end user devices may include processing systems, data storage systems, communication interfaces to communicate with the virtual computing service, user interface elements to interface with the provided virtual desktop, or any other similar computing element. To communicate with virtual computing service 120 and the assigned virtual machine, the end user devices may employ internet protocol (IP), Ethernet, optical networking, wireless protocols, communication signaling, or some other communication format—including combinations thereof.

Virtual computing service 120 may include communication interfaces, network interfaces, processing systems, computer systems, microprocessors, storage systems, storage media, or some other processing devices or software systems, and can be distributed among multiple devices. Virtual computing service 120 may comprise one or more server computers, desktop computers, or some other computing device capable of managing the connection between end user devices and virtual machines. Although illustrated as separate, it should be understood that virtual computing service 120 may execute on the same computing systems as virtual machines 130 and/or application storage volumes 140.

Virtual machines 130 execute via one or more host computing systems, and hypervisors that abstract the physical components of the host and provide the components to the virtual machine. These virtual components may include virtual processors, communication interfaces, and other virtualized components of the physical host system. Each of the host systems may include communication interfaces, network interfaces, processing systems, computer systems, microprocessors, storage systems, storage media, or some other processing devices or software systems. To communicate with virtual machines 130 and the corresponding host machines, virtual computing service 120 may employ internet protocol (IP), Ethernet, optical networking, wireless protocols, communication signaling, or some other communication format—including combinations thereof.

Application storage volumes 140 may be stored on solid-state media, hard disk media, or some other similar type of media, including combinations thereof. Volumes 141-143 may, in some implementations, comprise virtual disk drives, such as VMDKs or VHDs, although it should be understood that volumes 141-143 might be physical volumes in some examples. Although illustrated separate in the present example, it should be understood that application storage volumes 140 might be stored on the host computing systems with virtual machines 130. In other implementations, application storage volumes 140 may reside on separate computing hardware accessible by virtual machines 130 and the corresponding host systems. This separate computing hardware may include communication interfaces, network interfaces, processing systems, computer systems, microprocessors, storage systems, storage media, or some other processing devices or software systems. Host computing systems may communicate with the separate volume hardware using internet protocol (IP), Ethernet, optical networking, wireless protocols, communication signaling, or some other communication format—including combinations thereof.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a virtual computing service that dynamically configures virtual machines with storage volumes as required for virtual sessions, the method comprising:
    capturing a login history indicative of when a plurality of users login to a plurality of virtual machines using the virtual computing service;
    identifying an anticipated login time for a subset of the plurality of users based on the login history;
    for the subset of the plurality of users, identifying a configuration time that is earlier than the anticipated login time; and
    configuring a virtual machine at the configuration time for each user in the subset of the plurality of users by attaching at least one storage volume associated with the user to the virtual machine.

2. The method of claim 1 wherein attaching the at least one storage volume associated with the user to the virtual machine comprises attaching at least one application storage volume associated with the user to the virtual machine.

3. The method of claim 2 wherein attaching the at least one application storage volume associated with the user to the virtual machine comprises mounting the at least one application storage volume to the virtual machine, and modifying registry keys on the virtual machine to make at least one application on the application storage volume executable on the virtual machine.

4. The method of claim 3 wherein the at least one application storage volume comprises executable files for the at least one application.

5. The method of claim 4 further comprising overlaying pointers for the executable files in an application directory on the virtual machine.

6. The method of claim 2 wherein attaching the at least one storage volume comprises mounting at least one user storage volume to the virtual machine.

7. The method of claim 1 wherein the at least one storage volume comprises at least one virtual machine disk or at least one virtual hard disk.

8. The method of claim 1 wherein identifying the configuration time that is earlier than the anticipated login time comprises identifying a time capable of completing the configured virtual machines for the subset of the plurality of users prior to the anticipated login time.

9. The method of claim 1 further comprising receiving a login from a first user in the subset of the plurality of users, and assigning the first user to a virtual machine configured for the first user.

10. The method of claim 1 further comprising identifying a first user in the subset of the plurality of users that fails to login within a login period following the anticipated login time, and detaching at least one storage volume associated with the first user from a virtual machine configured for the first user.

11. An apparatus comprising:
    one or more non-transitory computer-readable storage media;
    program instructions stored on the one or more non-transitory computer-readable storage media to operate a virtual computing service that, when read and executed by a processing system, direct the processing system to at least:
    capture a login history indicative of when a plurality of users login to a plurality of virtual machines using the virtual computing service;
    identify an anticipated login time for a subset of the plurality of users based on the login history;
    for the subset of the plurality of users, identify a configuration time that is earlier than the anticipated login time; and
    configure a virtual machine at the configuration time for each user in the subset of the plurality of users by attaching at least one storage volume associated with the user to the virtual machine.

12. The apparatus of claim 11 wherein the program instructions to attach the at least one storage volume associated with the user to the virtual machine direct the processing system to attach at least one application storage volume associated with the user to the virtual machine.

13. The apparatus of claim 12 wherein the program instructions to attach the at least one application storage volume associated with the user to the virtual machine direct the processing system to mount the at least one application storage volume to the virtual machine and modify registry keys on the virtual machine to make at least one application on the storage volume executable on the virtual machine.

14. The apparatus of claim 13 wherein the at least one application storage volume comprises executable files for the at least one application.

15. The apparatus of claim 14 wherein the program instructions further direct the processing system to overlay pointers for the executable files in an application directory on the virtual machine.

16. The apparatus of claim 12 wherein the program instructions to attach the at least one storage volume direct the processing system to mount at least one user storage volume to the virtual machine.

17. The apparatus of claim 11 wherein the at least one storage volume comprises at least one virtual machine disk or at least one virtual hard disk.

18. The apparatus of claim 11 wherein the program instructions to identify the configuration time that is earlier than the anticipated login time direct the processing system to identify a time capable of completing the configured virtual machines for the subset of the plurality of users prior to the anticipated login time.

19. The apparatus of claim 11 wherein the program instructions further direct the processing system to identify a first user in the subset of the plurality of users that fails to login within a login period following the anticipated login time, and detach at least one storage volume associated with the first user from a virtual machine configured for the first user.

20. The apparatus of claim 11 further comprising the processing system operatively coupled with the one or more non-transitory computer-readable storage media.

* * * * *